US012612333B2

(12) United States Patent
Lu et al.

(10) Patent No.: US 12,612,333 B2
(45) Date of Patent: Apr. 28, 2026

(54) PRECISE ION IMPLANTATION TYPE MODIFIED GEOPOLYMER AND PREPARATION METHOD THEREOF

(71) Applicant: Wuhan University, Wuhan (CN)

(72) Inventors: Haifeng Lu, Wuhan (CN); Kai Zhang, Wuhan (CN); Dong He, Wuhan (CN); Xiaoxuan Kong, Wuhan (CN); Xiangheng Xiao, Wuhan (CN); Hang Xu, Wuhan (CN)

(73) Assignee: Wuhan University, Wuhan (CN)

( * ) Notice: Subject to any disclaimer, the term of this patent is extended or adjusted under 35 U.S.C. 154(b) by 493 days.

(21) Appl. No.: 18/130,918

(22) Filed: Apr. 5, 2023

(65) Prior Publication Data

US 2024/0109809 A1 Apr. 4, 2024

(30) Foreign Application Priority Data

Sep. 21, 2022 (CN) ......................... 202211153096.6

(51) Int. Cl.

| | |
|---|---|
| ***C04B 12/00*** | (2006.01) |
| ***C04B 28/00*** | (2006.01) |
| ***C04B 28/08*** | (2006.01) |
| ***C04B 40/00*** | (2006.01) |
| ***C04B 103/10*** | (2006.01) |

(52) U.S. Cl.
CPC .......... *C04B 12/005* (2013.01); *C04B 28/006* (2013.01); *C04B 28/08* (2013.01); *C04B 40/0007* (2013.01); *C04B 2103/10* (2013.01)

(58) Field of Classification Search
CPC ..... C04B 12/005; C04B 28/006; C04B 28/08; C04B 40/0007; C04B 2103/10; Y02P 40/10
See application file for complete search history.

(56) References Cited

U.S. PATENT DOCUMENTS 4,452,827 A 6/1984 Kolev et al.

FOREIGN PATENT DOCUMENTS

| | | | | |
|---|---|---|---|---|
| CN | 113716898 A | | 11/2021 | |
| WO | WO-2020097690 A1 | * | 5/2020 | ............. C04B 28/04 |
| WO | WO-2022125033 A1 | * | 6/2022 | ........... C04B 28/006 |

* cited by examiner

*Primary Examiner* — Anthony J Green
(74) *Attorney, Agent, or Firm* — Jose Cherson Weissbrot

(57) ABSTRACT

The present application provides a precise ion implantation type modified geopolymer and an efficient preparation method thereof, wherein the precise ion implantation type modified geopolymer comprise: a geopolymer source material with a specific size, which implanted by Si and Al ions with a designated dose by an ion implanter. The geopolymer source material consists of a mixture of solid waste, alkali activator, and water.

9 Claims, 5 Drawing Sheets

PRECISE ION IMPLANTATION TYPE MODIFIED GEOPOLYMER AND PREPARATION METHOD THEREOF

CROSS REFERENCE

This application claims the benefit of priority from China patent applications No. 202211153096.6, filed on Sep. 21, 2022, which is incorporated herein by reference in their entirety.

TECHNICAL FIELD

The present application relates to the technical field of solid waste utilization and material engineering, in particular, the present application related to a precise ion implantation type modified geopolymer and an efficient preparation method thereof.

BACKGROUND

Coal gangue, slag, sedimentary mud in river and lake and other industrial wastes are facing the difficulty of disposal, and there are some vital problems like hidden danger of piling, pollution of the soil and ground water nearby, serious harm to the natural ecological environment. Therefore, the problem of how to effectively dispose coal gangue and other industrial waste is urgently to solve.

Geopolymer is a new type of green inorganic silica-aluminum gel material, and the major raw material of which are active silica-aluminum raw materials and alkaline activator, then obtained by the appropriate process of solution-monomer reconstruction-polycondensation reaction and so on. The raw materials of geopolymer can widely use industrial wastes rich in silicon and aluminum elements (calcined coal gangue powder, activated sedimentary mud powder, steel slag powder, slag powder, fly ash, boiler slag, etc.). The properties of obtained geopolymer are similar to cement materials, but compared with cement, it has a series of advantages such as good durability and low energy consumption, which is an ideal material to replace cement and other traditional grouting materials.

However, as the content of active silicon and aluminum in existing raw materials mainly composed of industrial wastes is unstable, the mineral composition and elemental composition between different raw materials are obvious differences, and the same raw materials will also have the above differences due to the different producing area or source. As a result, it is difficult to accurately control the mechanical properties of the geopolymer materials obtained from different raw materials, and the mixing ratio design of multi-source solid waste raw materials is relatively blind. Now, when preparing the geopolymer of different raw materials precursors in China, most of them use the orthogonal experiment method for test mixing. This method has obvious blindness and low repeatability, and the conclusion is not universal, which significantly affects the popularization and application of geopolymer. Based on this situation, the patentee has carried out a series of studies and provides a new technology that can be used to guide the efficient preparation of multi-source geopolymers. The method has high reliability and excellent comprehensive efficiency, which is helpful to promote this type of new material to popularize and use in the engineering field, and is of great significance to realize the organic combination of the areas of energy, environmental protection, and construction engineering.

SUMMARY

Based on this situation, the embodiments of the present application provide a gel material of precise ion implantation type modified geopolymer, and provide an efficient preparation of multi-source geopolymer.

The present application provides a gel material of precise ion implantation type modified geopolymer, which consists of a geopolymer source material with a preset size that implanted by Si ion and Al ion with a designated dose by an ion implanter.

Furtherly, the source material consists of a mixture of solid waste, alkali activator, and water.

Furtherly, solid waste comprises one or any combination of high-calcium solid waste raw materials (such as steel slag powder, slag powder, boiler slag and the like), low-calcium solid waste raw materials (such as calcined coal gangue powder, activated sediment powder, fly ash and the like) and other industrial wastes rich in active silicon and aluminum elements.

Furtherly, the alkali activator is formed by mixing sodium hydroxide and sodium silicate according to a certain proportion, the modulus is 1.2~1.8.

Furtherly, the mass ratio of the alkali activator to the water is 0.08~0.12:1; the mass ratio of water to solid waste is 0.25~0.65:1; the implanting dose of Si and Al ions implanted by the ion implanter is $1\times10^{16}$~ $2\times10^{17}$ ions/$cm^2$.

Furtherly, the accelerating voltage of the ion implanter is 40~80 keV.

The present application also provides an efficient preparation of multi-source geopolymer which comprises the following steps:

- Step 1, add the alkali activator into the solid waste according to a certain mixing ratio, then add water, fully stir and mix to obtain a geopolymer source material, and pretreat the source material to obtain a matrix with a preset size;
- Step 2, placing the matrix in a vacuum sample table of an ion implanter, and under a certain accelerating voltage, implanting Si and Al ions into the matrix at a specified dose.
- Step 3, carrying out a nano-indentation test and obtain the average hardness of the surface gel phase of the matrix before and after ion implantation;
- Step 4, carrying out an ICP-OES test to obtain the leaching concentration of Si and Al of the geopolymer raw material.

The above-mentioned geopolymer gel material can be fully activated by adding a small amount of alkali excitant to accelerate the polymerization reaction in the solid waste rich in silicon and aluminum, and the generated polymerization products are filled with each other, the porosity is reduced, and the strength is improved.

Under the action of alkali activator, the geopolymer undergoes a process of breaking and recombining silicon-oxygen bonds and aluminum-oxygen bonds, and finally a stable three-dimensional polyaluminate structure is generated. The reaction equations are as follow:

$$n(Si_2O_5, Al_2O_2) + wSiO_2 + 4nH_2O \xrightarrow{KOH,\ NaOH} n(OH)_3\text{—}Si\text{—}O\text{—}Al\text{—}O\text{—}Si\text{—}(OH)_3 \quad (1)$$

-continued (2)

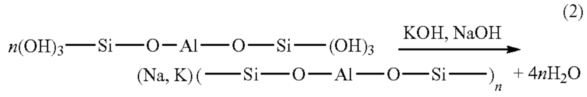

According to the precise ion implantation type modified geopolymer, a high-energy ion implanter is used for implanting Si and Al ions with specified concentrations into the geopolymer source material, so that can achieve the goal of modifying the material surface. By implanting a dose of $1\times10^{16}$~$2\times10^{17}$ ions/$cm^2$ Si and Al ions, the composition of silicon and aluminum elements in the geopolymer source material is quantitatively adjusted, and comparing to the concentrations before implantation, the concentrations of Si and Al ions can be increase by 1.6%~32%, and finally directly change the mechanical properties of the geopolymer gel material.

In the above nano-indentation test, the influence of ion concentration adjustment on the mechanical properties of geopolymer can be intuitively obtained by testing the surface hardness and elastic modulus (referring to the ratio of stress and strain of the material under the state of stress) of the matrix before and after ion implantation treatment. Compared with that before implantation, the index of nano-indentation hardness of the matrix will change correspondingly.

In the above ICP-OES test, the leaching concentration of the Si and Al ions in the solid waste rich in silicon and aluminum is obtained by testing, and is used as the concentration of the active silicon and aluminum elements of this solid waste; furtherly, the concentration of active silicon and aluminum elements in the solid waste rich in silicon and aluminum can be adjusted by adding other mineral or chemical additive, according to the result of Step 3.

Implementing the embodiment of the present application can bring the following benefits: according to the technical scheme provided by the invention, the ion implantation technology is innovatively introduced to carry out the research on the geopolymer precise implantation technology and method, which changes the blind premix method in the prior geopolymer preparation process, and is helpful to greatly improve the preparation efficiency of the target geopolymer and reduce the preparation cost. Meanwhile, the source materials used by the method are mainly related industrial solid wastes such as sediment, steel slag, fly ash and the like. The prepared geopolymer can be used for various application scenes such as municipal administration, geotechnical engineering construction, field of grouting reinforcement and the like, which can greatly improve the dissipation capacity of multi-source industrial solid wastes and promote the sustainable development of related industries, and it is of great significance to the organic combination of energy, environmental protection and construction engineering.

BRIEF DESCRIPTION OF THE DRAWINGS

In order to specifically explain the technical solutions in the embodiments of the present application, the figures required in the description of the embodiments will be briefly introduced below. However, it is to be appreciated that the following figures are some embodiments of the present application, and those ordinary skilled in the art can imply other figures based on the provided ones with the premise of no creative effort.

DETAILED DESCRIPTION OF THE EMBODIMENTS

Hereinafter, the technical solutions in the embodiments of the present application will be clearly and completely described in combination with the drawings in the embodiments of the present application. Obviously, the described embodiments are some embodiments of the present application, but not all embodiments. Based on the embodiments of the present application, all other embodiments obtained by a person skilled in the art with the premise of no creative effort belong to the protection scope of the present application.

The terms "first," "second," "third," and "fourth," etc. in the description and claims of the present application and in the accompanying drawings are used for distinguishing between different objects and not for describing a particular order. In addition, that term "include" and "have," as well as any variations thereof, are intend to cover a non-exclusive inclusion. For example, a process, method, system, product, or equipment that comprises a series of steps or elements is not limited to the mentioned steps or elements, but may alternatively include other steps or elements not mentioned, or may alternatively include other steps or elements inherent to such process, method, product, or equipment.

Reference herein to "an embodiment" means that a particular feature, result, or characteristic described in connection with the embodiment can be included in at least one embodiment of the present application. The appearances of this term in various places in the specification are not necessarily all referring to the same embodiment, nor are separate or alternative embodiments mutually exclusive of other embodiments. It is explicitly and implicitly understood by those skill in the art that the embodiments describe herein may be combined with other embodiments.

Figure 1:
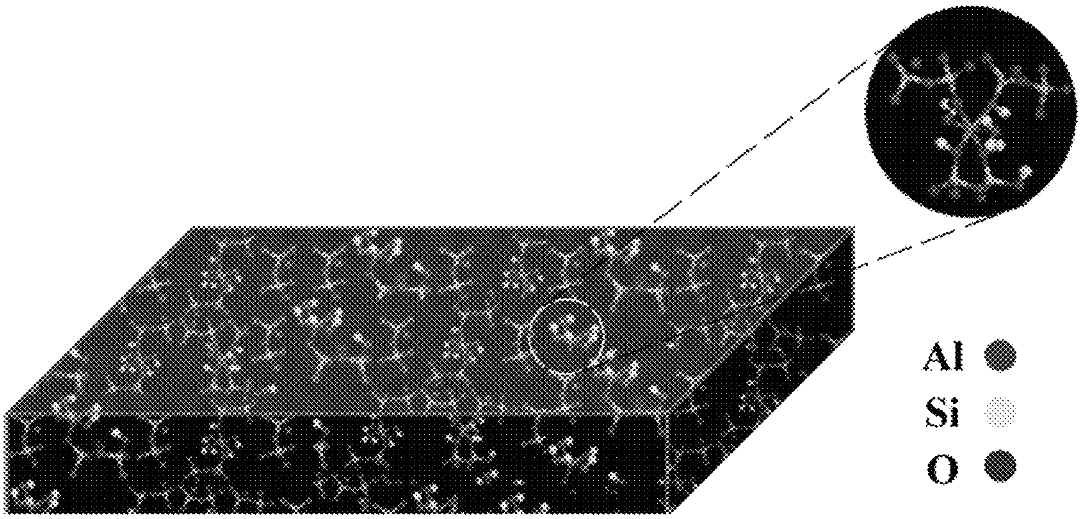
FIG. 1 is a structural diagram of the microstructure of the geopolymer according to the present application.

Referring to FIG. 1, FIG. 1 is a schematic diagram of a microstructure of a geopolymer. As shown in FIG. 1, the geopolymer is an aluminosilicate formed by a certain number of $[SiO_4]$ tetrahedra and $[AlO_4]$ tetrahedra connected in a way of vertex angles.

Figure 2:
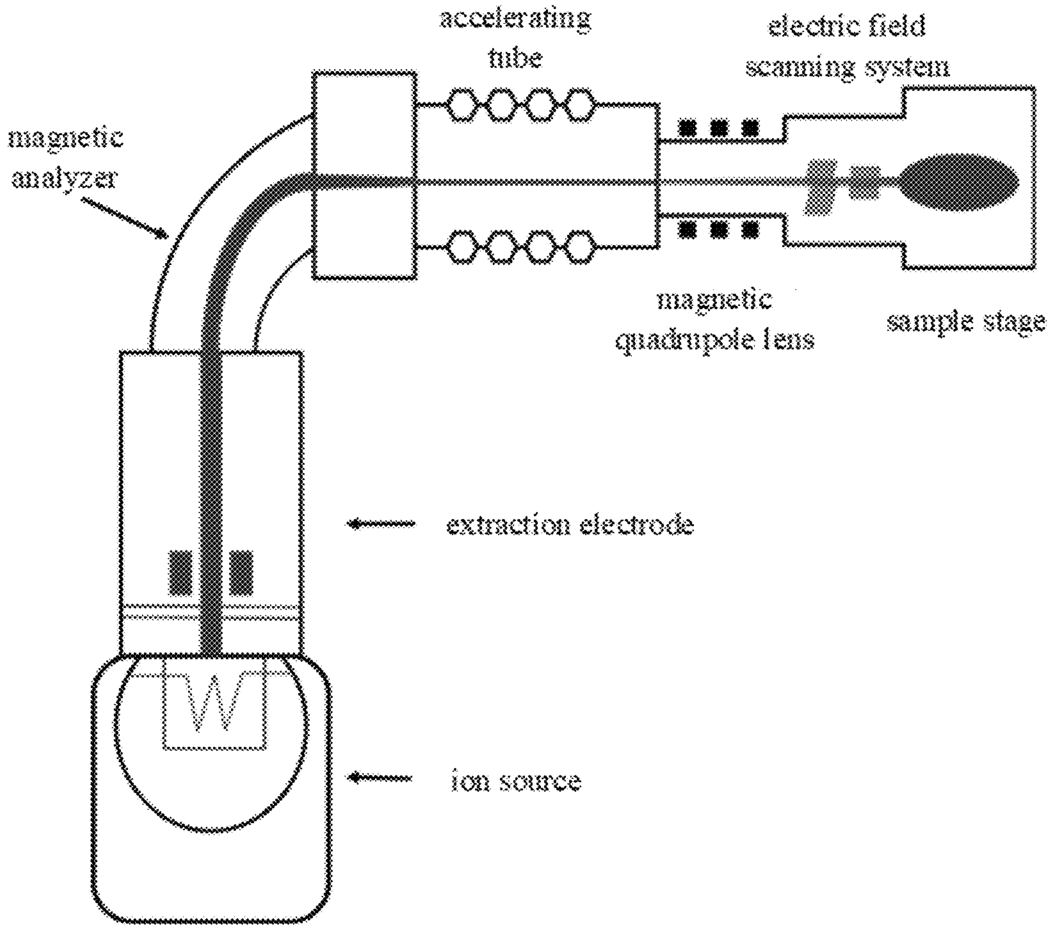
FIG. 2 is a structural diagram of an ion implanter according to the present application.

Referring to FIG. 2, FIG. 2 is a structural diagram of an ion implanter. As shown in FIG. 2, the ion implanter comprises: an ion source, an extraction electrode, a magnetic analyzer, an accelerating tube, a magnetic quadrupole lens, an electric field scanning system and a sample stage.

Figure 3:
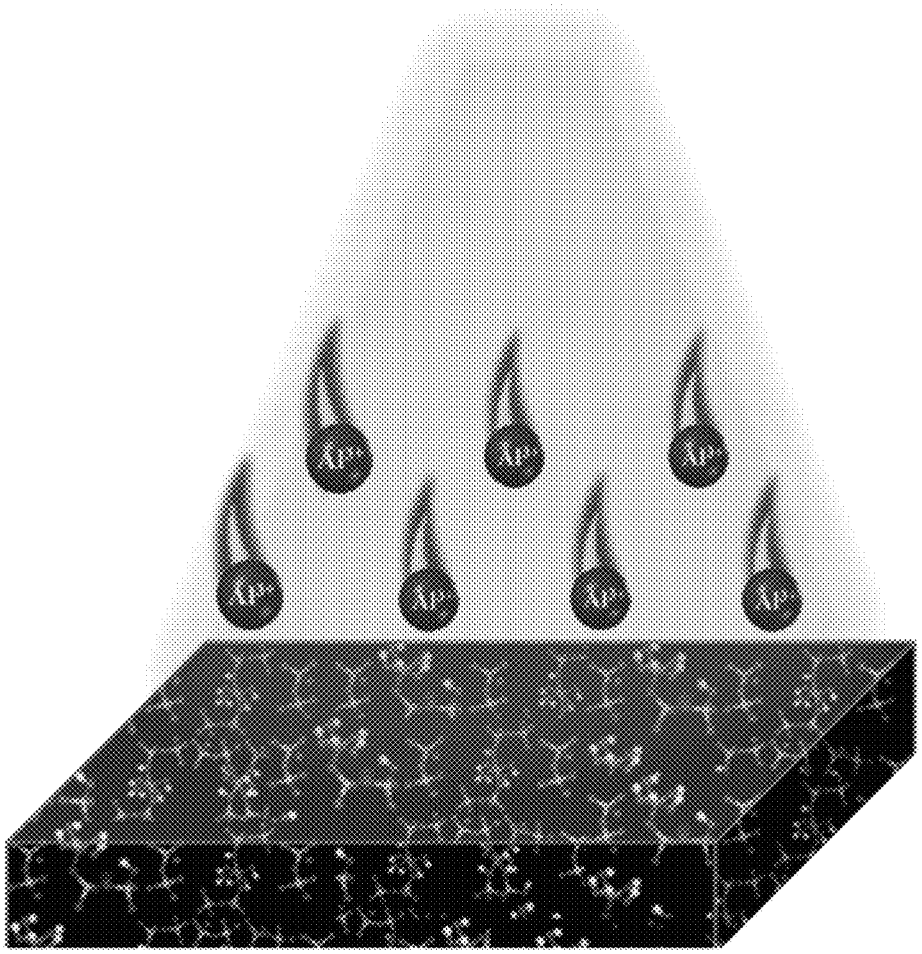
FIG. 3 is a schematic diagram of a process of precisely implanting ions into a geopolymer according to the present application.

Referring to FIG. 3, FIG. 3 is a schematic diagram of a process of precisely implanting ions into a geopolymer. As shown in FIG. 3, ions generated by an ion source are emitted to the surface of a matrix at a high speed and collide with atoms in the matrix, and finally stay in the matrix, which realizes that Si and Al ions are precisely implanted into the geopolymer material at a specified dose.

Figure 4:
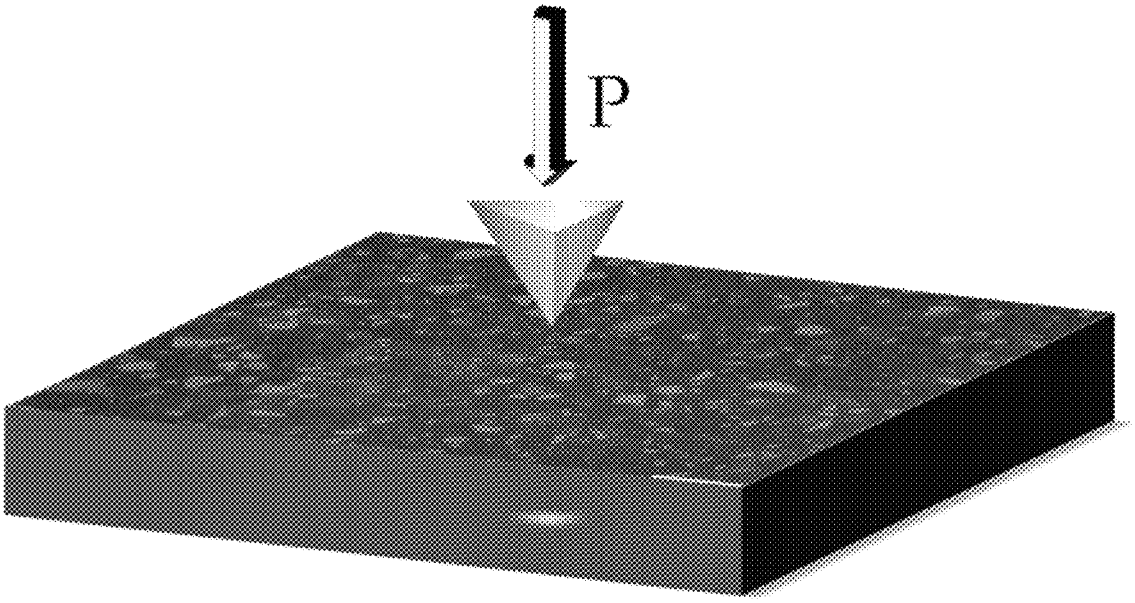
FIG. 4 is a schematic diagram of a nano-indentation test according to the present application.

Referring to FIG. 4, FIG. 4 is the schematic diagram of nano-indentation test. As shown in FIG. 4, a diamond indenter with certain shape (triangular pyramid, spherical shape, etc.) and mechanical parameters is used to press into the sample surface with ultra-low load. During the pressing process, the sample surface with the indenter attaching firstly undergoes elastic deformation, and with the increase of pressing load, the plastic deformation begins to develop, and finally an indentation consistent with the indenter shape is formed on the sample surface. Finally, the elastic modulus and hardness of the sample surface can be obtained.

Figure 5:
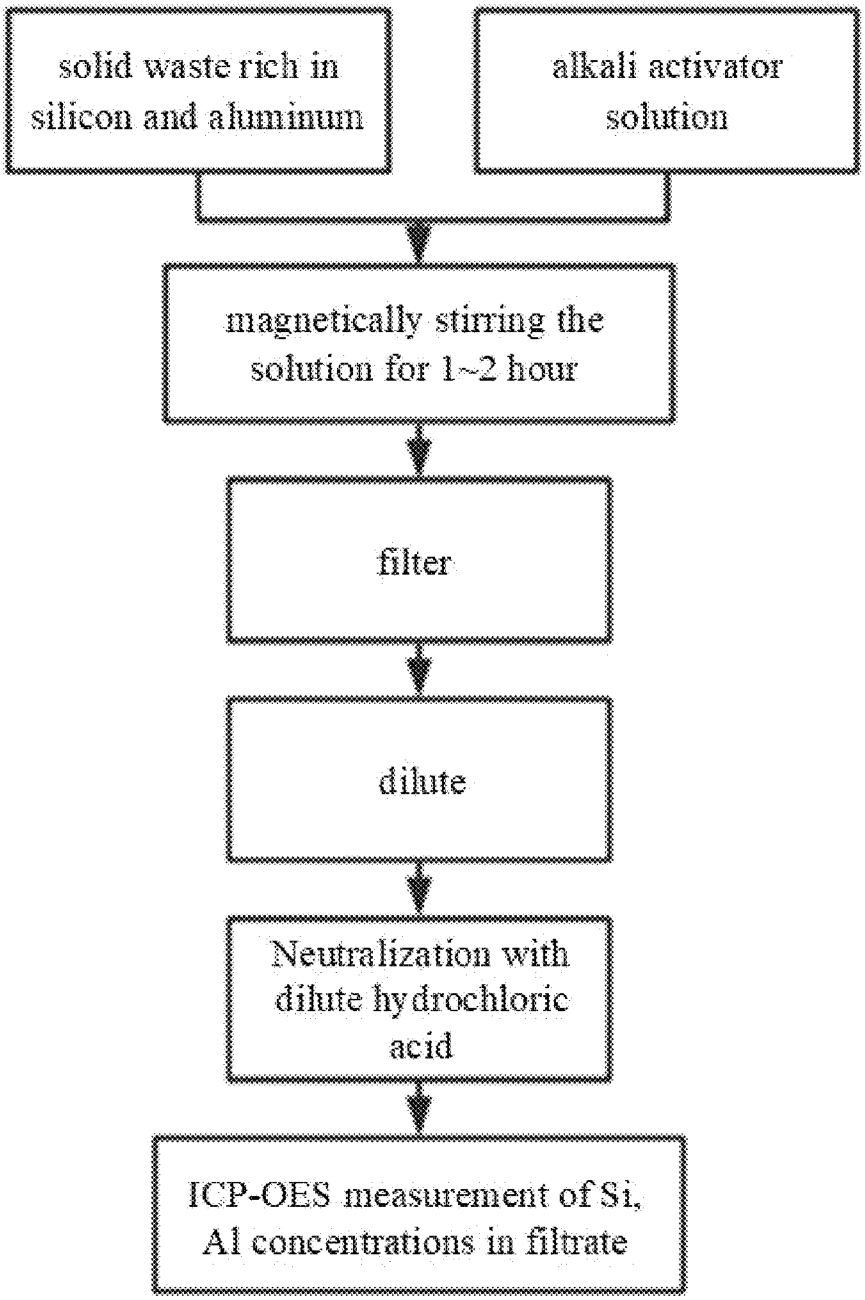
FIG. 5 is a flow chart of an ICP-OES test according to the present application.

Referring to FIG. 5, FIG. 5 is the flow chart of ICP-OES test. As shown in FIG. 5, mix the solid wastes rich in silicon and aluminum with alkali activator solution according to 0.025 g/mL, wherein the concentration of $OH^-$ in the alkali activator solution is 5 mol/L; filter and dilute the filtrate to 0.02 mol/L after magnetically stirring the solution for 1~2 hour and further adding 37% dilute hydrochloric acid to neutralize the filtrate. The concentrations of Si and Al in the filtrate are measured by ICP-OES.

The embodiments of the present application further provide a precise ion implantation type modified geopolymer, which may specifically include: a geopolymer source material with a preset size, and one or a combination of Si and Al ions with a designated dose implanted by an ion implanter.

Illustratively, the above preset size may specifically be: 3~8 mm thick sheet with a cross-sectional area of not more than 2500 $mm^2$ and flat upper and lower surfaces. The above preset size can be set by the user, and the application is not limited to the above preset size.

Illustratively, the ion implantation dose of Si and Al ions implanted by the above-mentioned ion implanter is $1\times10^{16}$~$2\times10^{17}$ ions/$cm^2$. That is, the number of ions in unit area (square centimeter) is $1\times10^{16}$~$2\times10^{17}$.

Illustratively, the above-mentioned geopolymer source material consists of a mixture of solid waste, alkali activator, and water; wherein the solid waste comprises one or any combination of high-calcium solid waste raw materials (such as steel slag powder, slag powder, boiler slag and the like), low-calcium solid waste raw materials (such as calcined coal gangue powder, activated sediment powder, fly ash and the like) and other industrial wastes rich in active silicon and aluminum elements.

Figure 7:
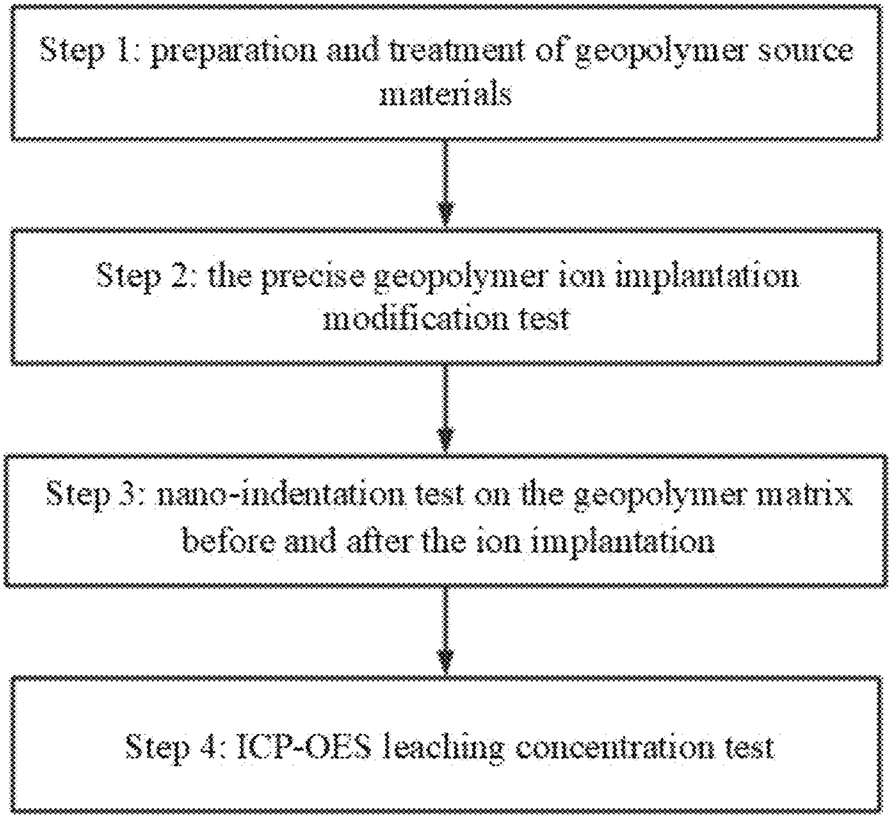
FIG. 7 is a schematic flow diagram of an efficient preparation method of geopolymer according to the present application.

Referring to FIG. 7, FIG. 7 provides a schematic flow diagram of an efficient preparation method of a geopolymer which is as shown in FIG. 3 and comprises the following steps:

Step 1: preparation and treatment of geopolymer source materials. Add the alkali activator into the solid waste according to a certain mixing ratio, then add water and fully stir and mix to obtain a geopolymer source material; and pretreat the source material to obtain a matrix with a certain size and as a matrix for ion implantation.

Illustratively, the above-mentioned certain mixing ratio is implemented as follows: the modulus (molar ratio) of the alkali activator is 1.2~1.8 (the modulus of the alkali activator can specifically represent the molar ratio of silicon dioxide to sodium oxide in the alkali activator); the mass ratio of the alkali activator to the water is 0.08~0.12:1; the mass ratio of water to solid waste is 0.25~0.65:1.

Illustratively, the above-mentioned pretreatment is performed as follows: firstly, process the prepared source material into a thin sheet having a cross-sectional area of not more than 2500 $mm^2$ and a thickness of 3 to 8 mm with flat upper and lower surfaces, and perform grinding, polishing, cleaning, and drying treatments in sequence. Specifically, an automatic grinding machine is used in the grinding treatment and silicon carbide abrasive paper of 400 meshes, 800 meshes, 1200 mesh, 2000 meshes and 5000 meshes is sequentially selected to grind the surface of the sample, and the grinding time of each grade of abrasive paper is 3~5 minutes. In the polishing process, the test surface is polished by 1~5 μm ultrafine alumina suspension and a polishing disk, and the polishing time is controlled in 5~10 minutes. In the cleaning treatment, absolute ethanol is used for washing the sample for 3~5 times; while in the drying treatment, the sample is dried in the condition of 50 degrees for 24 hours.

Step 2: the precise ion implantation modification test. The geopolymer matrix obtained in the step 1 is placed in a vacuum sample table of an ion implanter, and under a certain accelerating voltage, ions generated by the ion source are emitted to the surface of the matrix at a high speed, colliding with atoms in the matrix, and finally stay in the matrix, achieving the goal that Si and Al ions are accurately implanted into the geopolymer material at a specified dose.

Illustratively, the above-mentioned precise implantation refers to control the type of implanted ion, the dose of implanted ion, and the acceleration voltage, to realize precise control of the element type, the element concentration, and the implantation depth range in the geopolymer matrix, wherein the dose of implanted ion is $1\times10^{16}$ to $2\times10^{17}$ ions/$cm^2$; The accelerating voltage is 40 to 80 keV.

Step 3: carry out a nano-indentation test on the geopolymer matrix before and after the ion implantation. The surface hardness and elastic modulus of the matrix before and after ion implantation are measured by nano-indentation test, which directly reflects the influence of element concentration adjustment on the mechanical properties of geopolymer.

Illustratively, the above-mentioned nano-indentation test is specifically performed as follows: the maximum indentation depth sets as 1000 nm, and the lattice spacing uses 50 μm. Displacement control is adopted in the loading process. When the thermal drift value of the testing machine drops to $<0.05$ nm/s, the test is automatically started. The Berkovich indenter is loaded to the set maximum depth at a strain rate of 0.05 $s^{-1}$, and then enters the holding stage of 10 s. Finally, the indenter is away from the test surface of the sample at a constant unloading rate (dF/dt) until complete unloading.

Figure 6:
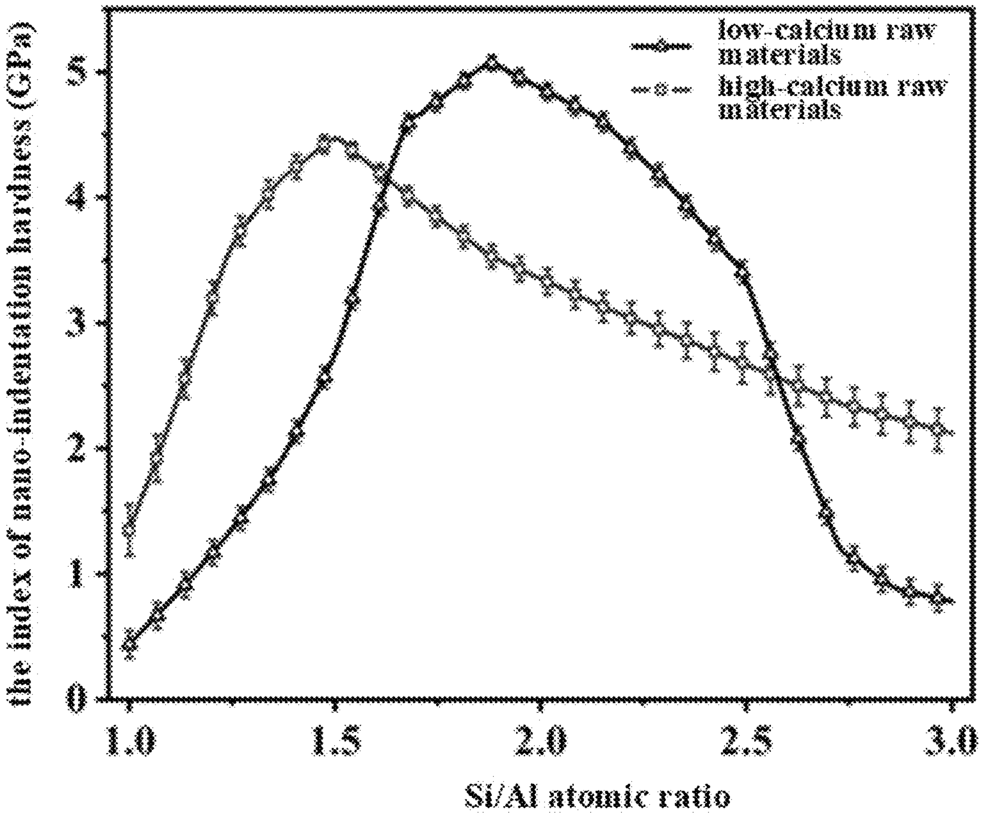
FIG. 6 is a relationship schematic diagram between the nano-indentation hardness index obtained by the method of the present application and the atomic ratio of silicon to aluminum in the geopolymer.

Referring to FIG. 6, FIG. 6 is a schematic diagram showing the relationship between the nano-indentation hardness index obtained by the method of the present application and the atomic ratio of silicon to aluminum in the geopolymer. As shown in FIG. 6, the nano-indentation hardness index range corresponding to geopolymers prepared from raw materials with different Si/Al atomic ratios can be obtained through the precise ion implantation test, nano-indentation test and ICP-OES leaching test, so as to provide more reliable guidance for the macroscopic accurate preparation of the geopolymer.

Illustratively, the effect of the above-mentioned element concentration adjustment on the mechanical properties of geopolymer is specifically reflected as follows: for the using high calcium raw material slag-based (chemical composition content (mass percentage): $SiO_2$ 34.5%, $Al_2O_3$ 17.7%, CaO 34.0%, MgO 6.0%, $Fe_2O_3$ 1.0%); concerning the geopolymer matrix, the average hardness of the gel on the matrix surface before injection is 3.46 GPa; after the implantation of Al ions with a dose of $1\times10^{16}$ ions/$cm^2$, the average hardness of the gel on the matrix surface is 3.89 GPa. After implantation of Si ions with a dose of $1\times10^{16}$ ions/$cm^2$, the average hardness of the gel on the matrix surface is 3.02 GPa. For the using low calcium raw material activated sediment powder ($SiO_2$ 49.7%, $Al_2O_3$22.2%, CaO 5.6%, MgO 1.8%, $Fe_2O_3$ 8.0%), concerning the geopolymer matrix, the average hardness of the gel on the matrix surface before injection is 3.12 GPa; after the implantation of Al ions with a dose of $1\times10^{16}$ ions/$cm^2$, the average hardness of the gel on the matrix surface is 3.54 GPa. After implantation of Si ions with a dose of $1\times10^{16}$ ions/$cm^2$, the average hardness of the gel on the matrix surface is 2.63 Gpa.

Step 4: ICP-OES leaching concentration test, wherein that leaching concentration of Si and Al in the solid waste of the geopolymer raw material is obtained through the ICP-OES test, and is used as the active silicon and aluminum element content of the solid waste raw material. Furtherly, may add other mineral or chemical additive to adjust the active silicon and aluminum elements content of the solid waste rich in silicon and aluminum according to the result of step 3.

Illustratively, the above-mentioned ICP-OES leaching concentration test is specifically performed as follows: mix the solid waste rich in silicon and aluminum with an alkali activator solution according to the ratio of 0.025 g/mL, wherein the concentration of $OH^-$ in the alkali activator solution is 5 mol/L; filter and dilute the filtrate to 0.02 mol/L after magnetically stirring the solution for 1~2 hour and further adding 37% dilute hydrochloric acid to neutralize the filtrate. The concentrations of Si and Al in the filtrate are measured by ICP-OES.

According to the technical scheme provided by the application, the ion implantation technology is innovatively introduced to carry out the research on the geopolymer precise implantation technology and method, which changes the blind premix method in the prior geopolymer preparation process, and is helpful to improve the preparation efficiency of the target geopolymer and reduce the preparation cost. Meanwhile, the source materials used by the method are mainly related industrial solid wastes such as calcined coal gangue powder, activated sediment powder, steel slag powder and the like. The prepared geopolymer can be used for various application scenes such as municipal administration, geotechnical engineering construction, field of grouting reinforcement and the like, which can greatly improve the dissipation capacity of multi-source industrial solid wastes and promote the sustainable development of related industries, and it is of great significance to the organic combination of energy, environmental protection and construction engineering.

It should be noted that, for the sake of simple description, the foregoing method embodiments are described as a series of action combinations, but those skilled in the art should understand that the present application is not limited by the order of the described actions, as some steps may be performed in other orders or simultaneously according to the present application. Secondly, those skilled in the art should also know that the embodiments described in the specification are all alternative embodiments, and the acts and modules involved are not necessarily required by the present application.

In the above embodiments, the description of each embodiment is focused on each other. For the parts that are not described in detail in a certain embodiment, please refer to the relevant description of other embodiments.

The embodiments of the present application are described in detail above, and the principles and implementation modes of the present application are illustrated by specific examples herein, and the description of the above embodiments is only used to help understand the method and core idea of the present application. Meanwhile, for those skilled in the art, according to the concept of the present application, there may be changes in the specific embodiment and application scope. Therefore, the description should not be construed as limiting the present application.

What is claimed is:

1. A precise ion implantation type modified geopolymer, wherein the geopolymer comprises:

a geopolymer source material with a preset size, and Si ion and Al ion with a designated dose implanted to the geopolymer source material with a preset size by an ion implanter.

2. The geopolymer of claim 1, wherein the geopolymer source material with a preset size comprises: a mixture of solid waste, alkali activator, and water;

wherein the solid waste comprises one or any combination of high-calcium solid waste raw materials, and low-calcium solid waste raw materials.

3. The geopolymer of claim 2, wherein the high-calcium solid waste raw materials comprise: steel slag powder, slag powder, boiler slag; the low-calcium solid waste raw materials comprise: calcined coal gangue powder, activated sediment powder, and fly ash.

4. The geopolymer of claim 1, wherein the designated dose is $1\times10^{16}$~$2\times10^{17}$ ions/$cm^2$.

5. The geopolymer of claim 2, wherein the alkali activator comprises: sodium hydroxide and sodium silicate.

6. A method for preparing a precise ion implantation type modified geopolymer of claim 1, wherein the method comprises the following steps:

Step 1: adding an alkali activator into the solid waste according to a certain mixing ratio, then adding water, fully stirring and mixing to obtain a geopolymer source material; pretreating the source material to obtain a matrix with a preset size;

Step 2: placing the matrix in a vacuum sample table of an ion implanter, and under a preset accelerating voltage, Si and Al ions are implanted into the matrix at a specified dose.

7. The method of claim 6, wherein the certain mixing ratio comprises: a mass ratio of the alkali activator to the water is 0.08~0.12:1; a mass ratio of water to solid waste is 0.25~0.65:1; the alkali activator has modulus of 1.2~1.8, represent a molar ratio of silicon dioxide to sodium oxide in the alkali activator.

8. The method of claim 6, wherein the pretreating the source material to obtain a matrix with a preset size comprises:

processing the prepared source material into a thin sheet with a cross-sectional area of no more than 2500 $mm^2$ and a thickness of 3~8 mm with flat upper and lower surfaces, and performing grinding, polishing, cleaning, and drying treatments in sequence; wherein an automatic grinding machine is used in the grinding treatment and silicon carbide abrasive paper of 400 meshes, 800 meshes, 1200 mesh, 2000 meshes and 5000 meshes is sequentially selected to grind a surface of the sample, and the grinding time of each grade of abrasive paper is 3~5 minutes; in the polishing process, a test surface is polished by 1~5 μm ultrafine alumina suspension and a polishing disk, and the polishing time is controlled in 5~10 minutes; in the cleaning treatment, absolute ethanol is used for washing the sample for 3~5 times; in the drying treatment, the sample is dried in the condition of 50 degrees for 24 hours.

9. The method of claim 6, wherein the preset accelerating voltage is 40~80 keV.

* * * * *